(12) United States Patent
Takahashi (10) Patent No.: US 11,931,897 B2
(45) Date of Patent: Mar. 19, 2024

(54) TORQUE ESTIMATION SYSTEM, TORQUE ESTIMATION METHOD, AND PROGRAM

(71) Applicant: Toyota Jidosha Kabushiki Kaisha, Toyota (JP)

(72) Inventor: Taro Takahashi, Urayasu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 231 days.

(21) Appl. No.: 17/190,635

(22) Filed: Mar. 3, 2021

(65) Prior Publication Data

US 2021/0276183 A1 Sep. 9, 2021

(30) Foreign Application Priority Data

Mar. 5, 2020 (JP) .................................. 2020-037882

(51) Int. Cl.
*B25J 9/16* (2006.01)
*B25J 13/08* (2006.01)

(52) U.S. Cl.
CPC .............. *B25J 9/1633* (2013.01); *B25J 9/163* (2013.01); *B25J 9/1653* (2013.01); *B25J 13/088* (2013.01)

(58) Field of Classification Search
CPC ........ B25J 9/1633; B25J 9/1653; B25J 9/163; B25J 13/088; B25J 9/1628; B25J 9/1612; B25J 9/1656
See application file for complete search history.

(56) References Cited

U.S. PATENT DOCUMENTS

| | | | |
|---|---|---|---|
| 10,773,725 B1* | 9/2020 | Ilievski | B60W 60/0015 |
| 2009/0069942 A1* | 3/2009 | Takahashi | B25J 9/1633 700/260 |
| 2009/0292428 A1* | 11/2009 | Corigliano | F16D 48/06 701/51 |
| 2016/0288825 A1 | 10/2016 | Varunjikar et al. | |
| 2017/0220034 A1* | 8/2017 | Jahanshahi | G05B 23/0232 |
| 2020/0089413 A1* | 3/2020 | Higashi | G06F 3/0679 |

FOREIGN PATENT DOCUMENTS

JP 2008-210273 A 9/2008
JP 2015150933 A * 8/2015

OTHER PUBLICATIONS

Reaction Force, Corrosionpedia, "https://www.corrosionpedia.com/definition/1608/reaction-force-compressive-strength" (Year: 2017).*

* cited by examiner

*Primary Examiner* — Adam R Mott
*Assistant Examiner* — Elizabeth Rose Neleski
(74) *Attorney, Agent, or Firm* — Dinsmore & Shohl LLP (57) ABSTRACT

It is possible to effectively prevent lowering of work efficiency while stabilizing an operation of a robot or the like. A torque estimation system estimates friction torque of a rotation mechanism. The torque estimation system inclues angular velocity detecting means for detecting an angular velocity of the rotation mechanism, and limit value setting means for setting an upper limit value and a lower limit value according to the angular velocity of the rotation mechanism detected by the angular velocity detection means, the upper limit value and the lower limit value limiting an upper limit and a lower limit, respectively, of the friction torque of the estimated friction torque.

12 Claims, 5 Drawing Sheets

TORQUE ESTIMATION SYSTEM, TORQUE ESTIMATION METHOD, AND PROGRAM

CROSS REFERENCE TO RELATED APPLICATIONS

This application is based upon and claims the benefit of priority from Japanese patent application No. 2020-037882, filed on Mar. 5, 2020, the disclosure of which is incorporated herein in its entirety by reference.

BACKGROUND

The present disclosure relates to a torque estimation system for estimating friction torque, a torque estimation method, and a program.

A torque estimation system for estimating friction torque using an estimation model of friction torque is known (see, for example, Japanese Unexamined Patent Application Publication No. 2008-210273).

SUMMARY

Since the torque estimation system does not include limit value setting means, there is a possibility that an estimated value of unexpected friction torque may be output. For example, when a robot is flexibly controlled using the estimated value of the unexpected friction torque, the operation of the robot becomes unstable. On the other hand, if each command value is simply limited or the like, there is a possibility that the work efficiency may be lowered due to, for example, an operation stop of the robot.

An object of the present disclosure is to provide a torque estimation system, a torque estimation method, and a program that can effectively prevent lowering of work efficiency while stabilizing an operation of a robot or the like.

An example aspect of the present disclosure in order to achieve the above object is a torque estimation system for estimating friction torque of a rotation mechanism including:
  angular velocity detecting means for detecting an angular velocity of the rotation mechanism; and
  limit value setting means for setting an upper limit value and a lower limit value according to the angular velocity of the rotation mechanism detected by the angular velocity detection means, the upper limit value and the lower limit value limiting an upper limit and a lower limit, respectively, of the friction torque of the estimated friction torque.

In this example aspect, the limit value setting means may set the upper limit value and the lower limit value based on at least a model based on Coulomb friction and viscous friction, a measurement error of the angular velocity detection means, and the angular velocity of the rotation mechanism.

In this example aspect, the limit value setting means may use values of the friction torque obtained by shifting the angular velocity detected by the angular velocity detection means on the model based on the Coulomb friction and the viscous friction by the measurement error as a temporary upper limit value and a temporary lower limit value, respectively, adds a predetermined margin value to the temporary upper limit value and the temporary lower limit value to calculate the upper limit value and the lower limit value and set the calculated upper limit value and the calculated lower limit value as the upper limit value and the lower limit value, respectively.

In this example aspect, the torque estimation system further includes:
  torque estimation means for estimating the friction torque of the rotation mechanism using an estimation model of the friction model generated by machine learning.

The torque estimation means may output the friction torque when the torque estimation means determines that the estimated friction torque is not equal to or greater than the upper limit value or is not equal to or less than the lower limit value set by the limit value setting means, and
  the torque estimation means may not output the friction torque when the torque estimation means determines that the estimated friction torque is equal to or greater than the upper limit value or is equal to or less than the lower limit value set by the limit value setting means.

Another example aspect of the present disclosure to achieve the above object may be a torque estimation method for estimating friction torque of a rotation mechanism including:
  detecting an angular velocity of the rotation mechanism; and
  setting an upper limit value and a lower limit value according to the detected angular velocity of the rotation mechanism, the upper limit value and the lower limit value limiting an upper limit and a lower limit, respectively, of the friction torque with respect to the estimated friction torque.

Another example aspect of the present disclosure to achieve the above object may be a program causing a computer to execute a torque estimation method for estimating friction torque of a rotation mechanism.

The torque estimation method includes:
  a process of setting an upper limit value and a lower limit value according to an angular velocity of the rotation mechanism, the upper limit value and the lower limit value limiting an upper limit and a lower limit, respectively, of the friction torque with respect to the estimated friction torque.

According to the present disclosure, it is possible to provide a torque estimation system, a torque estimation method, and a program that can effectively prevent lowering of work efficiency while stabilizing an operation of a robot or the like.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
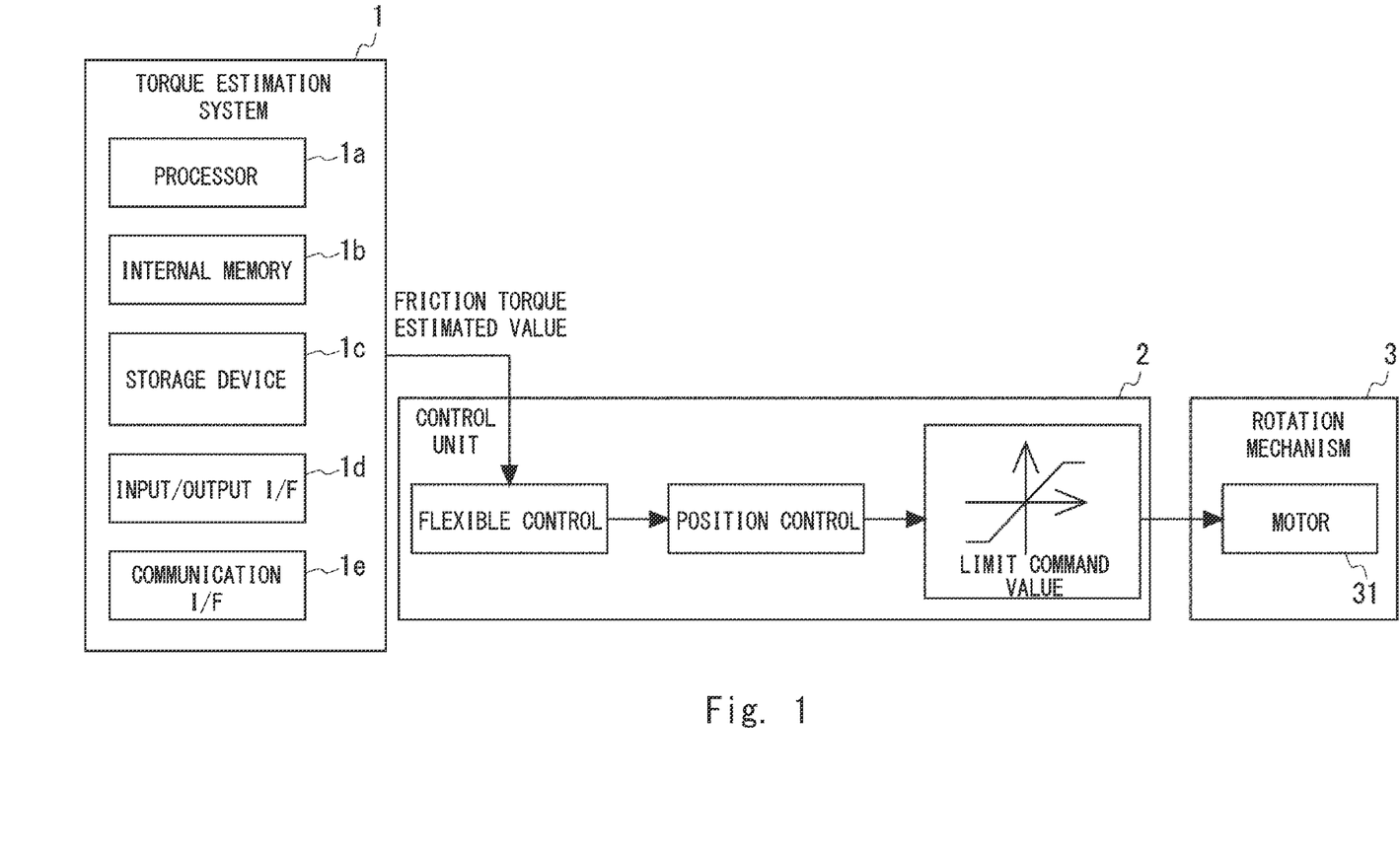
FIG. 1 is a block diagram showing an example of a method of controlling a joint part of a robot.

Hereinafter, an embodiment of the present disclosure will be described with reference to the drawings. FIG. 1 is a block diagram showing an example of a method of controlling a joint part of a robot. A torque estimation system 1 according to this embodiment estimates friction torque of a rotation mechanism 3 such as a joint part of the robot. The friction torque is generated by rotation of each gear of the rotation mechanism 3.

The torque estimation system 1 uses, for example, an angular velocity of the rotation mechanism 3 as an input value, the friction torque of the rotation mechanism 3 as an output, performs machine learning such as deep learning to generate an estimation model of the friction torque. The torque estimation system 1 estimates the friction torque using the generated estimation model of the friction torque. A control unit 2 of the robot or the like performs flexible control of a motor 31 of the rotation mechanism 3 such as each joint part based on an estimated value of the friction torque output (hereinafter, estimated friction torque) from the torque estimation system 1.

A limit value is set for a command value such as a position command value and a speed command value in the flexible control performed by the control unit 2 in order to stably operate the robot. The control unit 2 has, for example, a safety function such as stopping an operation of the motor 31 of the rotation mechanism 3 such as each joint part when each command value exceeds a limit value when performing flexible control.

The torque estimation system 1 has a hardware configuration of a normal computer provided with a processor 1a such as a CPU (Central Processing Unit) or a GPU (Graphics Processing Unit), an internal memory 1b such as a RAM (Random Access Memory) or a ROM (Read Only Memory), a storage device 1c such as an HDD (Hard Disk Drive) or an SDD (Solid State Drive), an input/output I/F 1d for connecting peripheral devices such as a display, and a communication I/F 1e for communicating with devices outside an apparatus (FIG. 1).

In the torque estimation system 1, for example, the processor 1a executes a program stored in the storage device 1c, the internal memory 1b, and the like while using the internal memory 1b, so that respective functional components described later can be realized.

As described above, since the torque estimation system estimates the friction torque by deep learning, there is a possibility that an unexpected friction torque estimated value may be output. When the flexible control of the robot is performed using the estimated value of the friction torque, the operation of the robot becomes unstable. On the other hand, if each command value is simply limited or the like, there is a possibility that the work efficiency may be lowered due to, for example, an operation stop of the robot.

On the other hand, the torque estimation system 1 according to this embodiment sets the upper limit value and the lower limit value for limiting the upper limit and lower limit, respectively, of the friction torque estimated value according to the angular velocity of the rotation mechanism 3.

The upper limit value and lower limit value limit the unexpected friction torque estimated value, and the friction torque estimated value becomes more stable. Therefore, by performing flexible control of the robot or the like using the stable friction torque estimated value, the control unit 2 can effectively prevent the operation stop of the robot or the like and the lowering of work efficiency while stabilizing the operation of the robot or the like.

Figure 2:
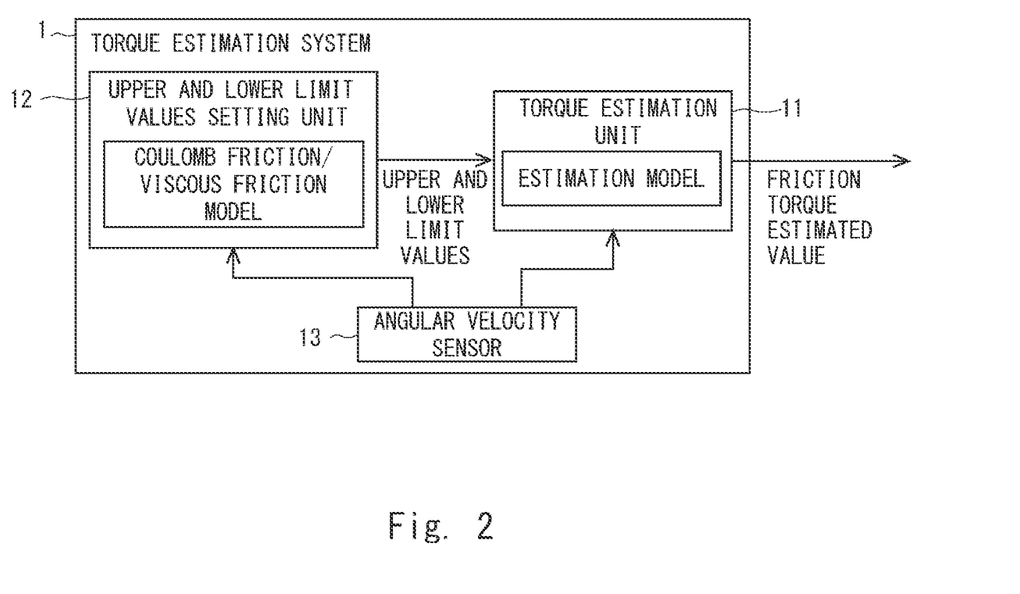
FIG. 2 is a block diagram showing a schematic system configuration of a torque estimation system according to this embodiment.

FIG. 2 is a block diagram showing a schematic system configuration of the torque estimation system according to this embodiment. The torque estimation system 1 according to this embodiment includes a torque estimation unit 11 for estimating the friction torque, a limit value setting unit 12 for setting the upper limit value and the lower limit value for the friction torque estimated value, and an angular velocity sensor 13 for detecting the angular velocity of the rotation mechanism 3.

The torque estimation unit 11 is a specific example of the torque estimation means. The torque estimation unit 11 uses the angular velocity of the rotation mechanism 3 as an input value and outputs the friction torque of the rotation mechanism 3, performs deep learning, and generates an estimation model of the friction torque.

The estimation model is configured as, for example, a Recurrent Neural Network (RNN). The estimation model may be configured as an LSTM (Long Short-Term Memory). The estimation model may be configured as a Convolutional Neural Network (CNN).

The torque estimation unit 11 estimates the friction torque using the generated estimation model of the friction torque and outputs it as the friction torque estimated value. The rotation mechanism 3 is provided with the angular velocity sensor 13 for detecting the angular velocity of the rotation mechanism 3. The angular velocity sensor 13 is a specific example of angular velocity detecting means. The torque estimation unit 11 calculates the friction torque estimated value based on the angular velocity of the rotation mechanism 3 detected by the angular velocity sensor 13 and the estimation model of the friction torque.

The limit value setting unit 12 is a specific example of limit value setting means. The limit value setting unit 12 sets the upper limit value and the lower limit value of the friction torque estimated value according to the angular velocity of the rotation mechanism 3. The torque estimation unit 11 outputs the friction torque estimated value when it determines that the friction torque estimated value is not equal to or greater than the upper limit value or is not equal to or less than the lower limit value set by the limit value setting unit 12. On the contrary, when the torque estimation unit 11 determines that the friction torque estimated value is equal to or greater than the upper limit value or is equal to or less than the lower limit value set by the limit value setting unit 12, the torque estimation unit 11 does not output the friction torque estimated value that is equal to or greater than the upper limit value or is equal to or less than the lower limit value. In this manner, it is possible to effectively prevent the unstable friction torque estimated value that is equal to or greater than the upper limit value or is equal to or less than the lower limit value from being output from the torque estimation unit 11.

Figure 3:
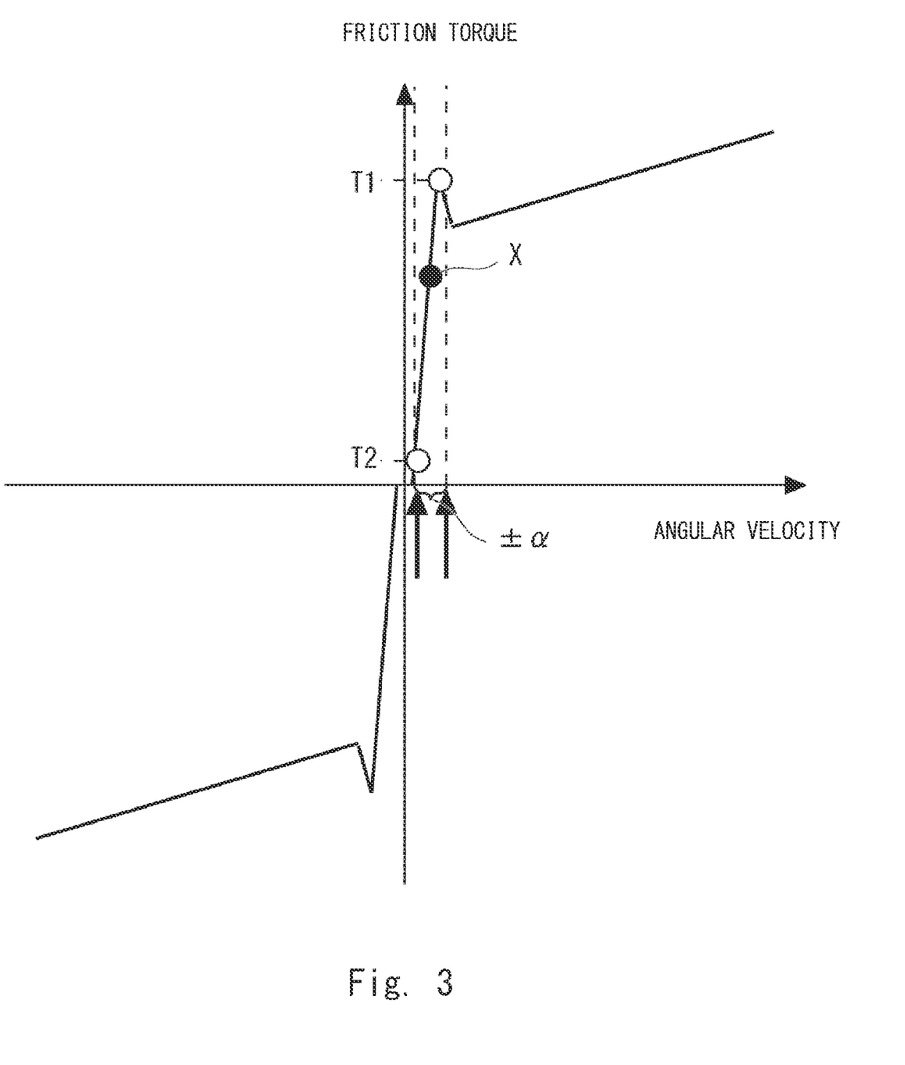
FIG. 3 is a diagram for explaining a method of setting an upper limit value and a lower limit value of a friction torque estimated value.

Next, a method of setting the upper limit value and the lower limit value of the friction torque estimated value will be described in detail. The limit value setting unit 12 varies the upper limit value and the lower limit value according to the angular velocity of the rotation mechanism 3 using a model of Coulomb friction and viscous friction. The models of Coulomb friction and viscous friction are, for example, as shown in FIG. 3, models showing the relationship between the angular velocity calculated based on the Coulomb friction and the viscous friction of the rotation mechanism 3 and the friction torque.

The Coulomb friction and viscous friction models may be models showing the relationship between the angular velocity calculated based on the Coulomb friction, viscous friction, and temperature of the rotation mechanism 3 and the friction torque. It is thus possible to set the upper limit value and the lower limit value of the friction torque estimated value with higher accuracy using the models of Coulomb friction and viscous friction in consideration of temperature.

The limit value setting unit 12 sets the upper limit value and the lower limit value based on the models of Coulomb friction and viscous friction, a measurement error of the angular velocity sensor 13, and the angular velocity detected by the angular velocity sensor 13. Since the friction torque largely fluctuates around the angular velocity 0, the upper limit value and the lower limit value are determined by the following method.

The limit value setting unit 12 sets a temporary upper limit vlaue and a temporary lower limit value (upper limit value T1 and lower limit value T2) based on the angular velocity detected by the angular velocity sensor 13 and the measurement error of the angular velocity sensor 13. The measurement error of the angular velocity sensor 13 may be set in advance in the limit value setting unit 12, and may be set by the user as appropriate.

For example, as shown in FIG. 3, when the measurement error is $\pm\alpha$, the limit value setting unit 12 sets the values of friction torque at the point where the value of the detected angular velocity X is shifted by $\pm\alpha$ on the models of Coulomb friction and viscous friction as the upper limit value T1 and the lower limit value T2.

Figure 4:
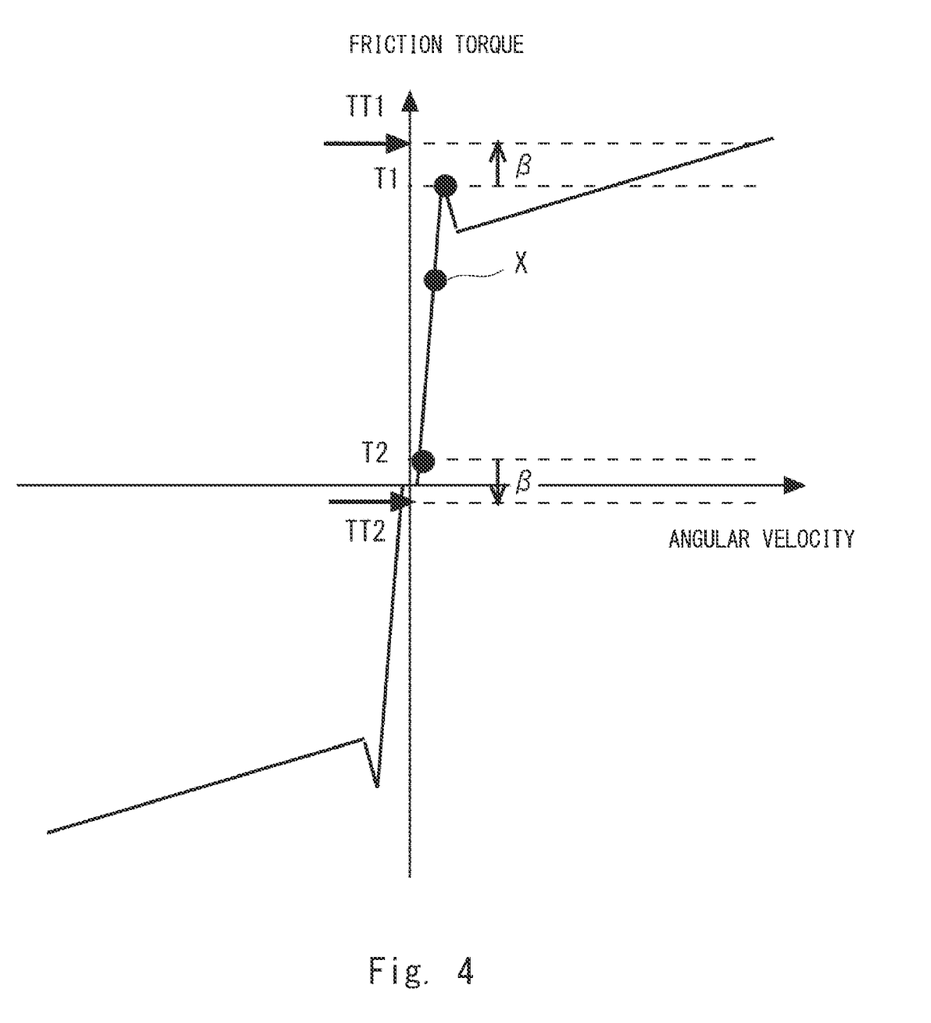
FIG. 4 is a diagram for explaining the method of setting an upper limit value and a lower limit value of the friction torque estimated value.

Next, as shown in FIG. 4, the limit value setting unit 12 calculates an upper limit value TT1 and a lower limit value TT2 obtained by adding a margin value $\pm\beta$ to the upper limit value T1 and the lower limit value T2, respectively, in consideration of safety. The margin value $\pm\beta$ may be set in the limit value setting unit 12 in advance, and may be set by the user as appropriate. The limit value setting unit 12 sets the calculated upper limit value TT1 and lower limit value TT2 as the upper limit value and the lower limit value, respectively. As described above, by setting the upper limit value and the lower limit value, it is possible to set a limit value that is appropriate, not too loosely limited, does not largely limit the original function or performance, and fluctuates according to the angular velocity.

Figure 5:
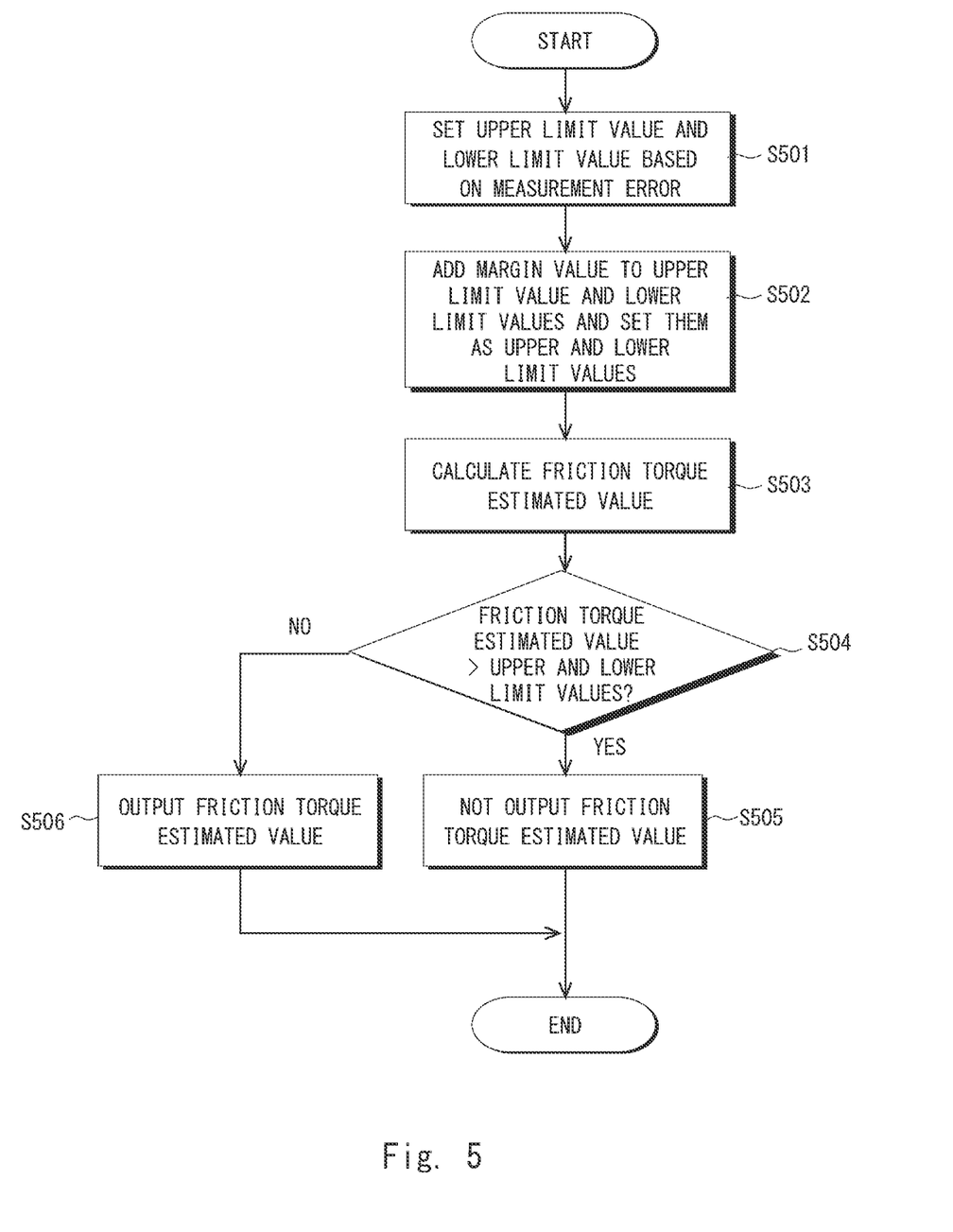
FIG. 5 is a flowchart showing a flow of a torque estimation method according to this embodiment.

Next, a flow of the torque estimation method according to this embodiment will be described. FIG. 5 is a flowchart showing the flow of the torque estimation method according to this embodiment.

The limit value setting unit 12 sets the upper limit value T1 and the lower limit value T2 based on the models of Coulomb friction and viscous friction, the angular velocity detected by the angular velocity sensor 13, and the measurement error of the angular velocity sensor 13 (Step S501).

The limit value setting unit 12 calculates the upper limit value TT1 and the lower limit value TT2 obtained by adding the margin value $\pm\beta$ to the upper limit value T1 and the lower limit value T2, respectively, and sets the calculated upper limit value TT1 and the lower limit value TT2 as the upper limit value and the lower limit value, respectively (Step S502).

The torque estimation unit 11 calculates the friction torque estimated value based on the angular velocity of the rotation mechanism 3 detected by the angular velocity sensor 13 and the estimation model of the friction torque (Step S503).

The torque estimation unit 11 determines whether or not the friction torque estimated value is equal to or greater than the upper limit value or is equal to or less than the lower limit value set by the limit value setting unit 12 (Step S504). When the torque estimation unit 11 determines that the friction torque estimated value is equal to or greater than the upper limit value or is equal to or less than the lower limit value (YES in Step S504), the torque estimation unit 11 does not output the friction torque estimated value that is equal to or greater than the upper limit value or is equal to or less than the lower limit value (Step S505). On the other hand, when the torque estimation unit 11 determines that the friction torque estimated value is not equal to or greater than the upper limit value or is not equal to or less than the lower limit value (NO in Step S504), the torque estimation unit 11 outputs the friction torque estimated value (Step S506).

As described above, the torque estimation system 1 according to this embodiment includes the limit value setting unit 12 that sets the upper limit value and the lower limit value for limiting the upper and lower limits, respectively, of the friction torque with respect to the estimated friction torque according to the angular velocity of the rotation mechanism 3. Thus, since the friction torque estimated value is stabilized by the upper limit value and the lower limit value, the lowering of the work efficiency can be effectively prevented while stabilizing the operation of the robot or the like.

Although some embodiments of the disclosure have been described, the embodiment is presented by way of example and are not intended to limit the scope of the disclosure. The new embodiment may be implemented in various other forms, and various omissions, substitutions, and modifications may be made without departing from the scope of the disclosure. These embodiments and variations thereof are included in the scope and the gist of the present disclosure, and are also included in the scope of the dislcosure described in the claims.

The present disclosure can be realized, for example, by causing the processor 1a to execute a computer program in the processing shown in FIG. 5.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.).

The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that each unit constituting the torque estimation system 1 according to the above embodiment can be realized not only by a program but some of all of the units constituting the torque estimation system 1 may be implemented by dedicated hardware such as an ASIC (Application Specific Integrated Circuit) or an FPGA (Field-Programmable Gate Array).

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A torque estimation system for estimating friction torque of a rotation mechanism comprising:
angular velocity detection means for detecting an angular velocity of the rotation mechanism; and limit value setting means for setting an upper limit value and a lower limit value according to the angular velocity of the rotation mechanism detected by the angular velocity detection means, the upper limit value and the lower limit value limiting an upper limit and a lower limit, respectively, of the friction torque of the estimated friction torque,
wherein the limit value setting means further sets the upper limit value and the lower limit value based on at least a model based on Coulomb friction and viscous friction, a measurement error of the angular velocity detection means, and the angular velocity of the rotation mechanism.

2. The torque estimation system according to claim 1, wherein:
the limit value setting means uses values of the friction torque obtained by shifting the angular velocity detected by the angular velocity detection means on the model based on the Coulomb friction and the viscous friction by the measurement error as a temporary upper limit value and a temporary lower limit value, respectively, adds a predetermined margin value to the temporary upper limit value and the temporary lower limit value to calculate the upper limit value and the lower limit value and set the calculated upper limit value and the calculated lower limit value as the upper limit value and the lower limit value, respectively.

3. The torque estimation system according to claim 1, further comprising:
torque estimation means for estimating the friction torque of the rotation mechanism using an estimation model of a friction model generated by machine learning, wherein
the torque estimation means outputs the friction torque when the torque estimation means determines that the estimated friction torque is not equal to or greater than the upper limit value or is equal to or less than the lower limit value set by the limit value setting means, and
the torque estimation means does not output the friction torque when the torque estimation means determines that the estimated friction torque is equal to or greater than the upper limit value or is equal to or less than the lower limit value set by the limit value setting means.

4. The torque estimation system according to claim 3, wherein the angular velocity of the rotation mechanism is an input value and the torque estimation means outputs the friction torque of the rotation mechanism, the model performs a deep learning and generates the estimation model of the friction torque based on the angular velocity as the friction torque estimated value.

5. A torque estimation method for estimating friction torque of a rotation mechanism comprising:
detecting an angular velocity of the rotation mechanism; and
setting an upper limit value and a lower limit value according to the detected angular velocity of the rotation mechanism, the upper limit value and the lower limit value limiting an upper limit and a lower limit, respectively, of the friction torque with respect to the estimated friction torque,
wherein the setting the upper limit value and the lower limit value is based on at least a model based on Coulomb friction and viscous friction, a measurement error of the angular velocity, and the angular velocity of the rotation mechanism.

6. A non-transitory computer readable medium storing a program causing a computer to execute a torque estimation method for estimating friction torque of a rotation mechanism, the torque estimation method comprising:
a process of setting an upper limit value and a lower limit value according to an angular velocity of the rotation mechanism, the upper limit value and the lower limit value limiting an upper limit and a lower limit, respectively, of the friction torque with respect to the estimated friction torque,
wherein the setting the upper limit value and the lower limit value is based on at least a model based on Coulomb friction and viscous friction, a measurement error of the angular velocity, and the angular velocity of the rotation mechanism.

7. A torque estimation system for estimating friction torque of a rotation mechanism comprising:
an angular velocity sensor configured to detect an angular velocity of the rotation mechanism; and
a limit value setting unit configured to set an upper limit value and a lower limit value according to the angular velocity of the rotation mechanism detected by the angular velocity sensor, the upper limit value and the lower limit value limiting an upper limit and a lower limit, respectively, of the friction torque of the estimated friction torque,
wherein the limit value setting unit further sets the upper limit value and the lower limit value based on at least a model based on Coulomb friction and viscous friction, a measurement error of the angular velocity sensor, and the angular velocity of the rotation mechanism.

8. The torque estimation system according to claim 7, wherein:
the limit value setting unit uses values of the friction torque obtained by shifting the angular velocity detected by the angular velocity sensor on the model based on the Coulomb friction and the viscous friction by the measurement error as a temporary upper limit value and a temporary lower limit value, respectively, adds a predetermined margin value to the temporary upper limit value and the temporary lower limit value to calculate the upper limit value and the lower limit value and set the calculated upper limit value and the calculated lower limit value as the upper limit value and the lower limit value, respectively.

9. The torque estimation system according to claim 7, further comprising:
torque estimation unit for estimating the friction torque of the rotation mechanism using an estimation model of a friction model generated by machine learning, wherein
the torque estimation unit outputs the friction torque when the torque estimation unit determines that the estimated friction torque is not equal to or greater than the upper limit value or is equal to or less than the lower limit value set by the limit value setting unit, and
the torque estimation unit does not output the friction torque when the torque estimation unit determines that the estimated friction torque is equal to or greater than the upper limit value or is equal to or less than the lower limit value set by the limit value setting unit.

10. The torque estimation system according to claim 9, wherein the angular velocity of the rotation mechanism is an input value and the torque estimation unit outputs the friction torque of the rotation mechanism, the model performs a deep learning and generates the estimation model of the friction torque based on the angular velocity as the friction torque estimated value.

11. The torque estimation system according to claim 10, wherein the model deep learning of the model is one of a Recurrent Neural Network, a Long Short-Term Memory, and a Convolutional Neural Network.

12. The torque estimation system according to claim 4, wherein the model deep learning of the model is one of a Recurrent Neural Network, a Long Short-Term Memory, and a Convolutional Neural Network.

\* \* \* \* \*